United States Patent
Saito et al.

(10) Patent No.: US 8,490,954 B2
(45) Date of Patent: Jul. 23, 2013

(54) LIQUID SEALED VIBRATION ISOLATING DEVICE

(75) Inventors: Jun Saito, Fujimino (JP); Masatomo Nishizaka, Fujimino (JP); Nobuo Kubo, Wako (JP); Hiroshi Yanagase, Wako (JP)

(73) Assignees: Yamashita Rubber Kabushiki Kaisha, Fujimino-Shi (JP); Honda Motor Co., Ltd., Tokyo (JP)

( * ) Notice: Subject to any disclaimer, the term of this patent is extended or adjusted under 35 U.S.C. 154(b) by 1013 days.

(21) Appl. No.: 12/517,113

(22) PCT Filed: Nov. 30, 2007

(86) PCT No.: PCT/JP2007/073183
§ 371 (c)(1),
(2), (4) Date: Jul. 15, 2009

(87) PCT Pub. No.: WO2008/069131
PCT Pub. Date: Jun. 12, 2008

(65) Prior Publication Data
US 2010/0072683 A1    Mar. 25, 2010

(30) Foreign Application Priority Data

Dec. 5, 2006 (JP) ................................. 2006-328645
Jun. 20, 2007 (JP) ................................. 2007-163219

(51) Int. Cl.
*F16F 5/00* (2006.01)
(52) U.S. Cl.
USPC .................................................... 267/140.13
(58) Field of Classification Search
USPC ........................... 267/140.13, 140.14, 140.12
See application file for complete search history.

(56) References Cited

U.S. PATENT DOCUMENTS

| 4,697,793 | A | | 10/1987 | Reuter et al. | |
|---|---|---|---|---|---|
| 5,029,824 | A | * | 7/1991 | LaBeau et al. | 267/140.13 |
| 5,853,063 | A | * | 12/1998 | Meyerink et al. | 267/140.13 |
| 7,815,174 | B2 | * | 10/2010 | Ueki et al. | 267/140.13 |
| 2011/0006466 | A1 | * | 1/2011 | Ichikawa et al. | 267/140.13 |
| 2011/0101581 | A1 | * | 5/2011 | Kubo et al. | 267/140.13 |
| 2012/0049423 | A1 | * | 3/2012 | Ishikawa et al. | 267/140.13 |

FOREIGN PATENT DOCUMENTS

| JP | 7-107416 | | 11/1995 |
|---|---|---|---|
| JP | 2001-213177 | | 8/2001 |
| JP | 2003-148548 | | 5/2003 |
| JP | 2004-003614 | | 1/2004 |
| JP | 2005-048906 | | 2/2005 |
| JP | 2006-132615 | | 5/2006 |
| JP | 2007-107712 | | 4/2007 |
| WO | WO 2004081408 | A1 * | 9/2004 |

* cited by examiner

*Primary Examiner* — Bradley King
(74) *Attorney, Agent, or Firm* — Rankin, Hill & Clark LLP

(57) ABSTRACT

To form a relief valve for preventing the generation of the cavitation phenomenon into a simple and accurately operable structure, there are provided a central thin wall portion and a fixing portion in an elastic diaphragm provided in the partition member to have the fixing portion fixed in position. A relief valve is integrally formed with an outer peripheral portion of the fixing portion. The relief valve is provided with an inclined surface formed on the side of a secondary liquid chamber and a recessed portion opened on the side of a primary liquid chamber and has a difference in rigidity in the circumferential direction. When the primary liquid chamber turns negative pressure, a hydraulic liquid in the secondary liquid chamber opens the relief valve and leaks to the primary liquid chamber so as to prevent the generation of the cavitation phenomenon.

9 Claims, 13 Drawing Sheets

Fig. 9    Left ⟵⟶ Right
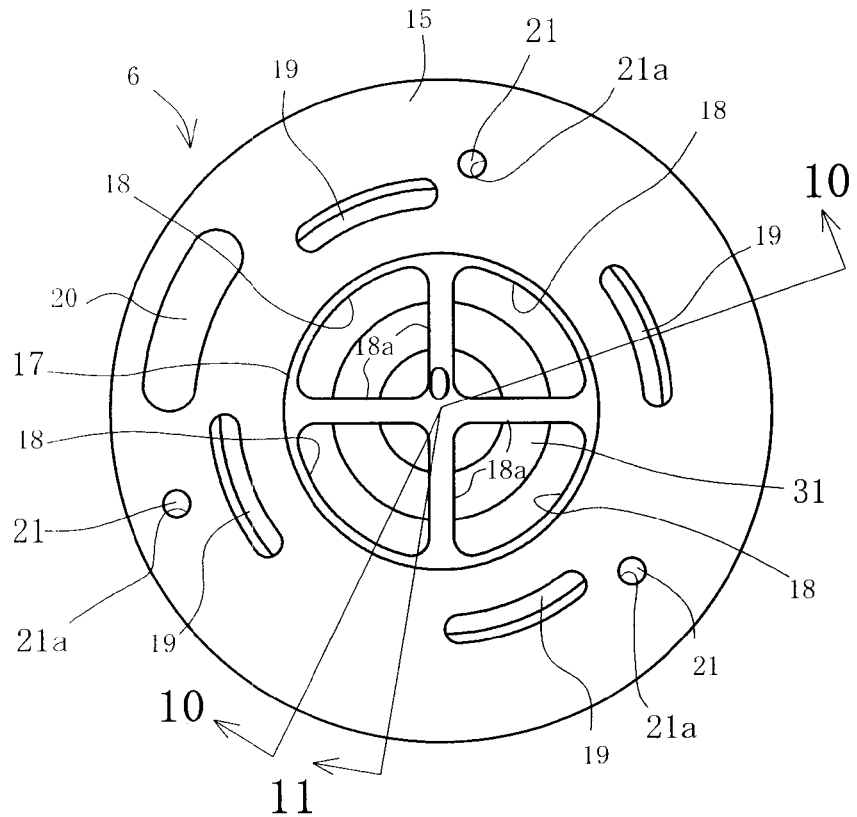
Fig. 10
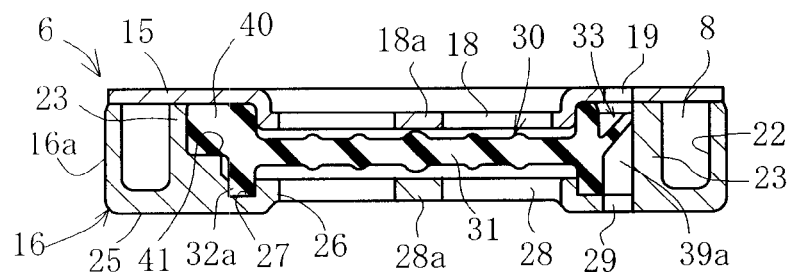
Fig. 11
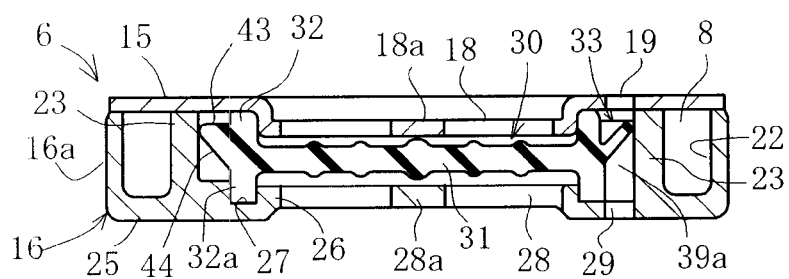

LIQUID SEALED VIBRATION ISOLATING DEVICE

BACKGROUND OF THE INVENTION

1. Field of the Invention

The present invention relates to a liquid sealed vibration isolating device for use in an engine mount or the like for motor vehicles and more particularly, to the device capable of effectively reducing noises created due to a cavitation phenomenon.

2. Description of the Related Art

In the liquid sealed vibration isolating device of this kind, negative pressure is developed instantaneously in a primary liquid chamber when the heavy load is applied, so as to cause the cavitation phenomenon that hydraulic liquid is partially vaporized, and then the noise is generated. In view of this, there are proposed various kinds of devices for reducing transmission of the noise. As one of the proposed devices, there is known the art that in the case of where the primary liquid chamber turns the negative pressure, the primary liquid chamber and an orifice passage are short circuited to leak the hydraulic liquid (see a patent reference 1). Also, there is known the art that an elastic diaphragm is arranged in a through hole provided in a partition member in such a manner that an outer peripheral portion of the diaphragm can be contacted with and be separated from an inner surface of the through hole. When vibration of large amplitude is inputted, an outer peripheral portion of the elastic diaphragm is deformed to project into a secondary liquid chamber so as to form a clearance for having a large amount of the hydraulic liquid leaked (see a patent reference 2).

Patent reference 1: Japanese patent laid open publication No. 2003-148548.

Patent reference 2: Japanese patent laid-open publication No. 2006-132615.

In the short circuit structure of the above patent reference 1, a portion of a wall constituting the orifice passage is formed by a lid portion of an elastic body. When the negative pressure is produced in the primary liquid chamber, the lid portion is elastically deformed to short circuit the orifice passage and the primary liquid chamber. Therefore, since the flow of the hydraulic liquid at the time of relief is throttled by a communication port of the orifice passage located on the side of the secondary liquid chamber, an enough relief amount may not necessarily by obtained instantaneously. Moreover, since the lid portion is formed integral with an insulator of a vibration isolating subject, the lid portion is deformed together with the insulator without being limited to the relief time thereby being capable of influencing the orifice performance. Accordingly, the relief valve structure in which the orifice passage is not involved is required.

Further, in the structure of the patent reference 2 employing the elastic diaphragm, a leak passage can be provided without relation to the orifice passage. However, since the elastic diaphragm itself is provided for the purpose of repeating the elastic deformation by the fluctuation of an internal pressure of the liquid chamber, the elastic diaphragm is elastically deformed also in the case where the vibration of minute amplitude is inputted. Then, the seal of the outer peripheral portion works incompletely to cause the leakage at the time of pressurization, so as to decrease the damping performance. Therefore, it is required to prevent the leakage by the minute vibration while controlling the generation of the cavitation phenomenon, thereby to minimize the decrease in the damping performance.

Further, it is ascertained that the elastic diaphragm is rotatively moved by the continuous input of the vibration of large amplitude thereby to cause the influence on the prevention of the cavitation phenomenon by the positional slippage between the relief valve and a leak passage. Therefore, it became necessary to arrest the rotation of the elastic diaphragm.

Accordingly, the present invention has its object to provide a liquid sealed vibration isolating device which materializes the above mentioned requirements.

SUMMARY OF THE INVENTION

To achieve the above mentioned object, a liquid sealed vibration isolating device according to a first aspect of the present invention comprises a first mounting member to be mounted on one of a couple of mounting counterparts, a second mounting member to be mounted on the other of the mounting counterparts, and an insulator for connecting in a vibration isolating state between the first and second mounting members. The device further including a primary liquid chamber using the insulator as a part of the wall thereof and being filled with a hydraulic liquid, and a secondary liquid chamber being partitioned from said primary liquid chamber by a partition member and having at least a portion of a wall formed by a diaphragm. The partition member has a leak hole for leaking the hydraulic liquid from the secondary liquid chamber to the primary liquid chamber, and a relief valve which is opened and closed to permit and stop leaking the hydraulic liquid through the leak hole from the secondary liquid chamber to the primary liquid chamber is provided in the partition member.

According to a second aspect of the present invention, the partition member is provided with an elastic diaphragm for absorbing fluctuation of an internal pressure within the primary liquid chamber and a frame portion having a fixing portion for fixing an outer peripheral portion of the elastic diaphragm. The leak hole is provided on an outer peripheral side of the fixing portion of the frame portion, and the relief valve is integrally provided with the elastic diaphragm across the fixing portion so as to shut the leak hole in a state of being capable of opening and closing.

According to a third aspect of the present invention, the relief valve is in contact with the frame portion surrounding the leak hole at all times except at the time of opening.

According to a fourth aspect of the present invention, the relief valve has a surface of the secondary liquid chamber side formed in a shape of a slope extending obliquely toward the primary liquid chamber and radially outwardly.

According to a fifth aspect of the present invention, the relief valve has a recessed portion opened on the side of the primary liquid chamber in the circumferential direction.

According to a sixth aspect of the present invention, the relief valve has a difference in rigidity in the circumferential direction.

A liquid sealed vibration isolating device according to a seventh aspect of the present invention comprises a first mounting member to be mounted on one of a couple of mounting counterparts, a second mounting member to be mounted on the other of the mounting counterparts, and an insulator for connecting in a vibration isolating state between the first and the second mounting members. The device further including a primary liquid chamber using the insulator as a part of the wall thereof and being filled with a hydraulic liquid, and a secondary liquid chamber being partitioned from the primary liquid chamber by a partition member and having at least a portion of a wall formed by a diaphragm. The partition member has a circular elastic diaphragm for absorbing internal pressure fluctuation of the primary liquid chamber and a frame member for supporting an outer peripheral portion of the elastic diaphragm, a leak hole for communicating between the primary liquid chamber and the secondary liquid chamber, being provided on an outer peripheral side of an elastic diaphragm supporting portion of the frame member, and a relief valve for opening and closing the leak hole being provided integral with the outer peripheral portion of the elastic diaphragm, wherein a thick wall portion is provided on the outer peripheral portion of the elastic diaphragm in the vicinity of the relief valve and supported by the frame member so as to arrest the rotation of the elastic diaphragm.

According to an eighth aspect of the present invention, the relief valve is formed by a thin wall portion of the outer peripheral portion of the elastic diaphragm, the thick wall portion, at least a portion of which is used for arresting the rotation, and the relief valve are formed alternately in the circumferential direction, and a difference in rigidity is given between the relief valve and the thick wall portion in the outer peripheral portion of the elastic diaphragm.

According to a ninth aspect of the present invention, more than one thick wall portion is provided, and the thick wall portion used for arresting the rotation is higher in rigidity than other thick wall portion.

According to a tenth aspect of the present invention, the thick wall portion used for arresting the rotation is provided with a seal lip for closely contacting the frame member.

According to an eleventh aspect of the present invention, a projection projecting from the thick wall portion is fitted into a hole provided on the frame member so as to arrest the rotation.

According to the invention as defined in the first aspect, since the leak hole is provided in the partition member to be opened and closed by the relief valve, the relief valve is opened when the primary liquid chamber turns the predetermined negative pressure, so as to leak a large amount of the hydraulic liquid rapidly from the secondary liquid chamber to the primary liquid chamber, so that the generation of the cavitation phenomenon is effectively prevented. Then, since the leak hole is provided in the partition member, it is possible to make an opening area wide and to ensure an enough relief amount. Also, the opening and closing movement of the relief valve is not influenced by the elastic deformation of other component members such as the elastic diaphragm or the like thereby not to be leaked by the input of the minute vibration. Therefore, it is possible to minimize the decrease in the damping performance.

According to the invention as defined in the second aspect, since the relief valve is provide integral with the elastic diaphragm and is integrally provided on the outer periphery of the fixing portion for fixing the outer peripheral portion of the elastic diaphragm, the relief valve is easily formed and can be arranged to save a space thereby to improve the space efficiency. Then, since the relief valve is functionally differentiated by the fixing portion from the main body portion of the elastic diaphragm which is a portion to be elastically deformed for absorbing the fluctuation of the internal pressure, the setting of the relief valve is easily performed. Also, since the opening and closing of the relief valve is not influenced by the elastic deformation of the main body portion of the elastic diaphragm, there is no leakage due to the input of the minute vibration thereby making it possible to minimize the decrease in the damping performance.

According to the invention as defined in the third aspect, since the relief valve is initialized to be in contact with the frame portion surrounding the leak hole at all times except at the time of opening, the leakage due to the input of the minute vibration can be surely prevented.

According to the invention as defined in the fourth aspect, since the relief valve has a surface of the secondary liquid chamber side formed in a shape of a slope extending obliquely toward the primary liquid chamber and radially outwardly, the leakage of the hydraulic liquid at the time of relief can be caused more reliably.

According to the invention as defined in the fifth aspect, the relief valve has a recessed portion opened on the side of the primary liquid chamber in the circumferential direction, whereby it can be swellingly deformed by the liquid pressure of the primary liquid chamber in the circumferential direction at the time of pressurization of the primary liquid chamber thereby to be further tightly contacted with the frame portion.

According to the invention as defined in the sixth aspect, since the relief valve has a difference in rigidity in the circumferential direction, a low rigidity portion can be opened first by having the hydraulic liquid concentrated thereon to improve the working accuracy of the relief valve so as to obtain the accurate leakage.

According to the invention as defined in the seventh aspect, the thick wall portion is provided on the outer peripheral portion of the elastic diaphragm in the vicinity of the relief valve and supported by the frame member so as to arrest the rotation of the elastic diaphragm. Therefore, the elastic diaphragm provided with the relief valve on the outer peripheral side of the fixing portion is arrested the rotation thereof even in the severe conditions that the vibration of large amplitude is repeatedly inputted, so that the positional relationship between the relief valve and a leak passage can be kept constant, thereby making it possible to effectively prevent the generation of the cavitation phenomenon.

According to the invention as defined in the eighth aspect, since the thin relief valve and the thick wall portion are formed alternately in the circumferential direction, it is possible to give the difference in rigidity to the relief valve and improve the workability of the relief valve by this rigidity difference. The thick wall portion for creating the difference in rigidity can be used for arresting the rotation.

According to the invention as defined in the ninth aspect, since the thick wall portion having a higher rigidity is used for arresting the rotation, it is possible to materialize the more reliable rotation arresting structure.

According to the invention as defined in the tenth aspect, since the thick wall portion used for arresting the rotation is provided with the seal lip for adhering to the frame member, the liquid leakage can be effectively prevented.

According to the invention as defined in the eleventh aspect, since the projection projecting from the thick wall portion is fitted into a hole provided on the frame member so as to arrest the rotation, it is possible to materialize the rotation arresting structure without providing the thick wall portion of high rigidity in particular.

BRIEF DESCRIPTION OF THE DRAWINGS

FIG. 9 is a plan view of a partition member in the assembled state;

FIG. 10 is a cross sectional view taken along line 10-O-10 of FIG. 9;

FIG. 11 is a cross sectional view taken along line 11-O-10 of FIG. 9;

DETAILED DESCRIPTION OF THE PREFERRED EMBODIMENTS

Figure 1:
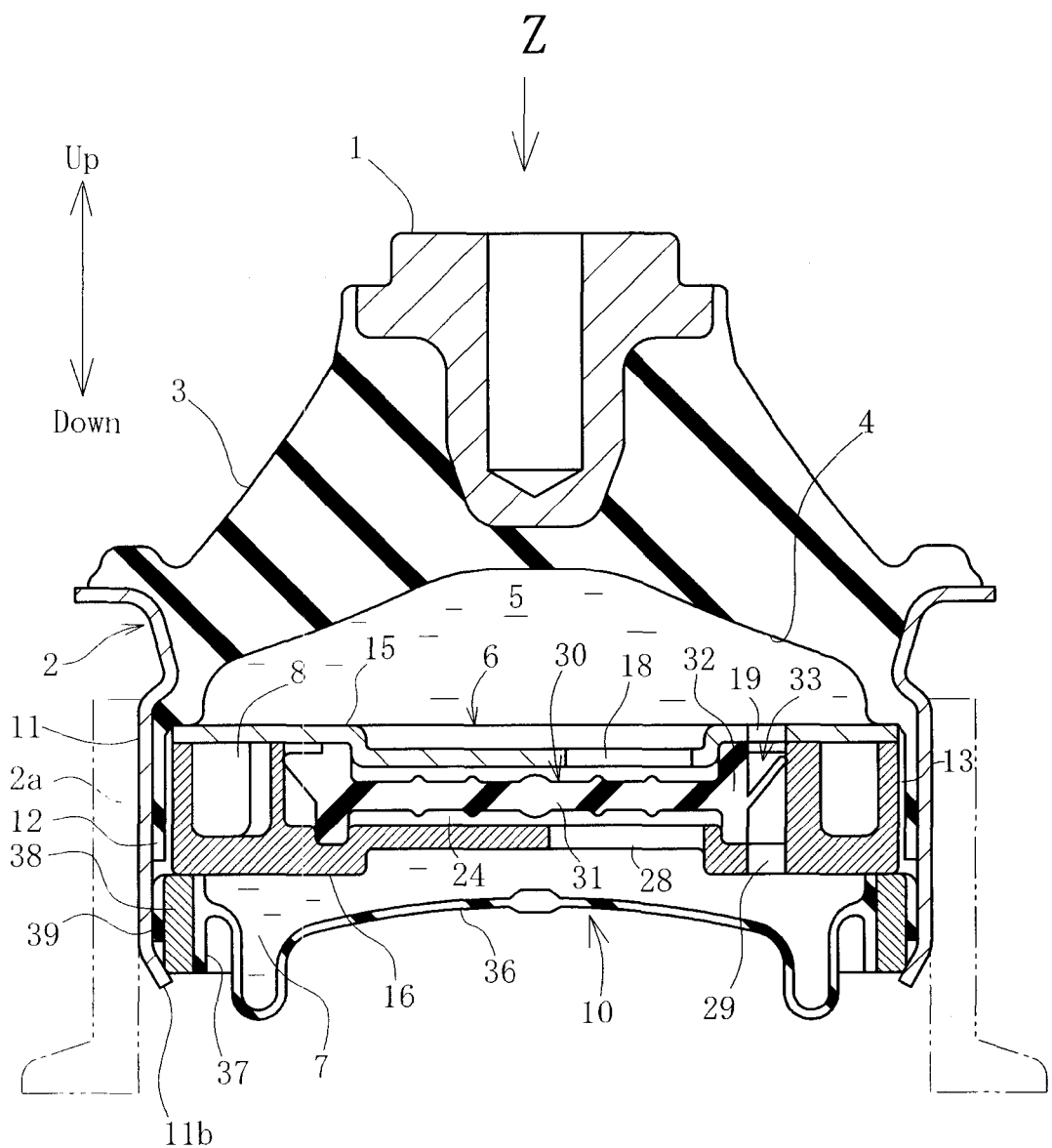
FIG. 1 is a vertical cross sectional view of an engine mount according to the first embodiment of the present invention.
Figure 2:
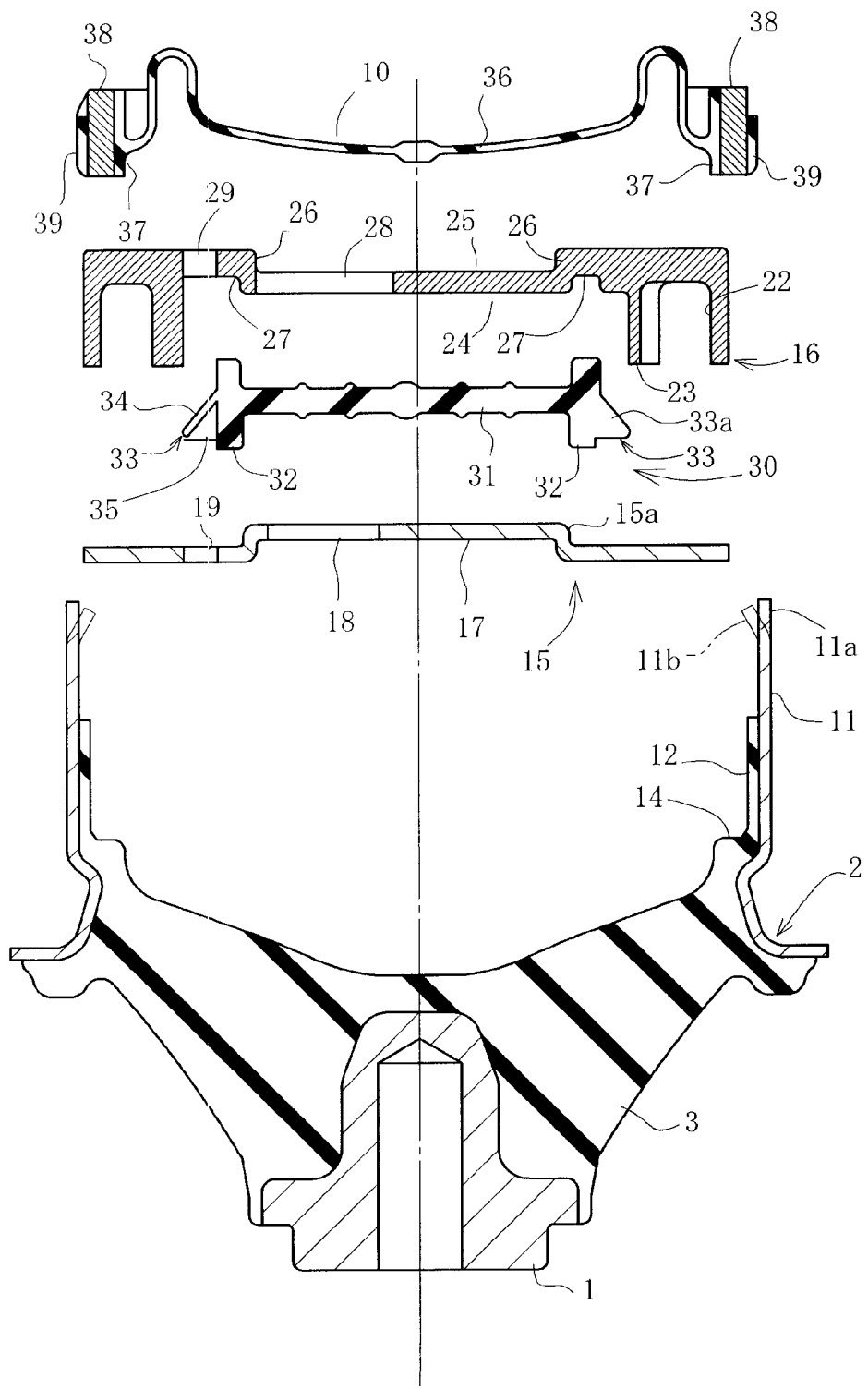
FIG. 2 is an exploded view of the above engine mount.

Hereinafter, the first embodiment embodied in an engine mount for motor vehicles will be explained with reference to the accompanying drawings, wherein FIG. 1 is a longitudinal cross sectional view of an engine mount, and FIG. 2 is an exploded view of each of components. FIG. 1 also is a cross section cut in the inputting direction Z of principal vibration. In the following explanation, each expression of the directions such as upward and downward, right and left is used based on an illustrated state in each of the drawings which is explained.

Referring now to these drawings, the engine mount comprises a first mounting member 1 to be mounted on the side of an engine (not shown) of the vibration source, a second mounting member 2 to be mounted on a vehicle body (not shown) on the vibration receiving side, and an insulator 3 adapted to connect these two members. The insulator 3 is formed by a known vibration isolating elastic member such as rubber or the like and is an elastic body functioning as a main vibration isolating member with respect to the vibration. The vibration inputted to the first mounting member 1 in the direction of Z is absorbed first by the elastic deformation of the insulator 3.

The insulator 3 is formed in the shape of substantially truncated conical trapezoid in cross section and provided with a dome portion 4 on the inside thereof. A hollowed portion which is opened downwardly in the drawing is formed by a dome portion 4 and forms a primary liquid chamber 5 which is filled with an incompressible hydraulic liquid.

The primary liquid chamber 5 is separated from a secondary liquid chamber 7 by a partition member 6 and communicated with the secondary liquid chamber 7 by an orifice passage 8 which is formed in the shape of an arc when viewed in the direction of Z. Herein, communication ports with each of liquid chambers at both ends of the orifice passage 8 are not shown in this drawing. The orifice passage 8 is configured to resonate with the vibration of low frequencies such as a shake vibration of about 10~11 Hz, etc. The secondary liquid chamber 7 is formed between a diaphragm 10 and the partition member 6, and a portion of a wall thereof is formed by the diaphragm 10.

The second mounting member 2 is provided with an outer cylindrical metallic fitting 11 of circular cylindrical shape. The outer cylindrical metallic fitting 11 is mounted on the vehicle body side, as the need arises, by being fitted into a holder 2a (see FIG. 1) or through a bracket. The outer cylindrical metallic fitting 11 forms a portion of the second mounting member 2. An inside of the outer cylindrical metallic fitting 11 is united with an extended portion 12 of the insulator 3. The extended portion 12 is extended downwardly to a level of the partition member 6 and integrally covers an inner wall of the outer cylindrical metallic fitting 11. A clearance 13 is formed between the extended portion 12 and the outer periphery of the partition member 6. A step 14 of thick wall is formed on an upper end of the extended portion 12 facing the primary liquid chamber 5, so as to position an outer peripheral end of the partition member 6.

The partition member 6 is a hollow frame shaped body and comprises an upper plate 15 and a lower holder 16 which are separated upwardly and downwardly. The upper plate 15 and the lower holder 16 each have rigidity and are formed of proper materials such as light metal, hard resin, etc. The upper plate 15 is formed in the shape of a disk and is lowered a step on the central side thereof to form a central step portion 17 in which an upper central opening 18 communicating with the primary liquid chamber 5 is formed. An upwardly opened arc-shaped groove 22 is provided on an outer periphery of the lower holder 16 to form the orifice passage 8 while an upwardly opened central recessed portion 24 is formed across an annular partition wall 23 forming an inner wall of the groove 22.

A bottom portion 25 is upwardly heightened a step on the central side thereof to form a step portion 26. Adjacent to this step portion 26 and on an outer peripheral side thereof there is provided an annular groove 27. Also, in a central area of the bottom portion 25 there is formed a lower central opening 28 which is in communication with the secondary liquid chamber 7.

An elastic diaphragm 30 is housed in the central recessed portion 24 of a space surrounded by the annular partition wall 23. The elastic diaphragm 30 is formed of a proper elastic body such as rubber or the like to constitute a member for absorbing the internal pressure fluctuation of the primary liquid chamber 5 and is integrally provided with a central thin wall portion 31, a fixing portion 32, and a relief valve 33 which is integrally formed on the outer peripheral side of the fixing portion 32.

The central thin wall portion 31 is accommodated between the central step portion 17 and the bottom portion 25 and is elastically deformed by the internal pressure fluctuation of the primary liquid chamber 5 in such a manner that the elastic deformation is developed by the liquid pressure of the hydraulic liquid passing in and out through the upper central opening 18 and the lower central opening 28. The fixing portion 32 is a rigid annular wall formed on the outer peripheral side of the central thin wall portion 31, and an upper portion of the fixing portion 32 is positioned by a step portion 15a (see FIG. 6) located on an outer periphery of the central step portion 17 of the upper plate 15 while a lower portion 32a thereof is positioned by being fitted into the annular groove 27, so that the fixing portion 32 functions as a restraint portion to be fixed by being held between the upper plate 15 and the lower holder 16 from the upper and lower sides so as to form an annular support for the central thin wall portion 31.

The relief valve 33 is formed integral with an outer peripheral side of the fixing portion 32 and has an inclined wall 34 slanting radially upwardly from the side of the secondary liquid chamber 7, so that the hydraulic liquid is easy to flow from the second liquid chamber 7 to the primary liquid chamber 5. On the primary liquid chamber 5 side of the relief valve 33 there is formed the recessed portion 35 which is opened to the primary liquid chamber 5. The relief valve 33 is adapted to leak the hydraulic liquid from the secondary liquid chamber 7 to the primary liquid chamber 5 through leak holes 19 and 29 which are formed in each of the outer peripheral portions of the upper plate 15 and the lower holder 16 and inside of the arc-shaped groove 22.

The diaphragm 10 is provided with a thin main body portion 36 and a thick wall portion 37 formed integral with the outer peripheral portion thereof. A fixing ring 38 is inserted into and united with the thick wall portion 37. A seal portion 39 which is a portion of the thick wall portion 37 is protruded radially outwardly from an outer peripheral wall of the fixing ring 38. The fixing ring 38 is press-fitted through the seal portion 39 into the inside of the outer cylindrical metallic fitting 11. The upper and lower end surfaces of the fixing ring 38 are exposed, and the upper end surface abuts on the outer periphery of the bottom portion of the lower holder 16 while the lower end surface is fixed by caulking by a bent portion 11a formed on the lower end side of the outer cylindrical metallic fitting 11.

In the case of assembling this engine mount, as shown in FIG. 2, at first, the sub-assembled body that the first mounting member 1, the second mounting member 2 and the insulator 3 are united together is made and turned upside down from the state in FIG. 1. Then, the partition member 6 is fitted into the inside of the outer cylindrical metallic fitting 11 so as to be positioned by the step 14. Next, the fixing ring 37 of the diaphragm 10 is press-fitted to be contacted with the upper surface in the illustrated state of the partition member 6. Then, the tip end of the outer cylindrical metallic fitting 11 is bent inwardly to form the bent portion 11b so as to press the upper end wall in the illustrated state of the fixing ring 38, so that the whole is assembled into a unit.

Figure 3:
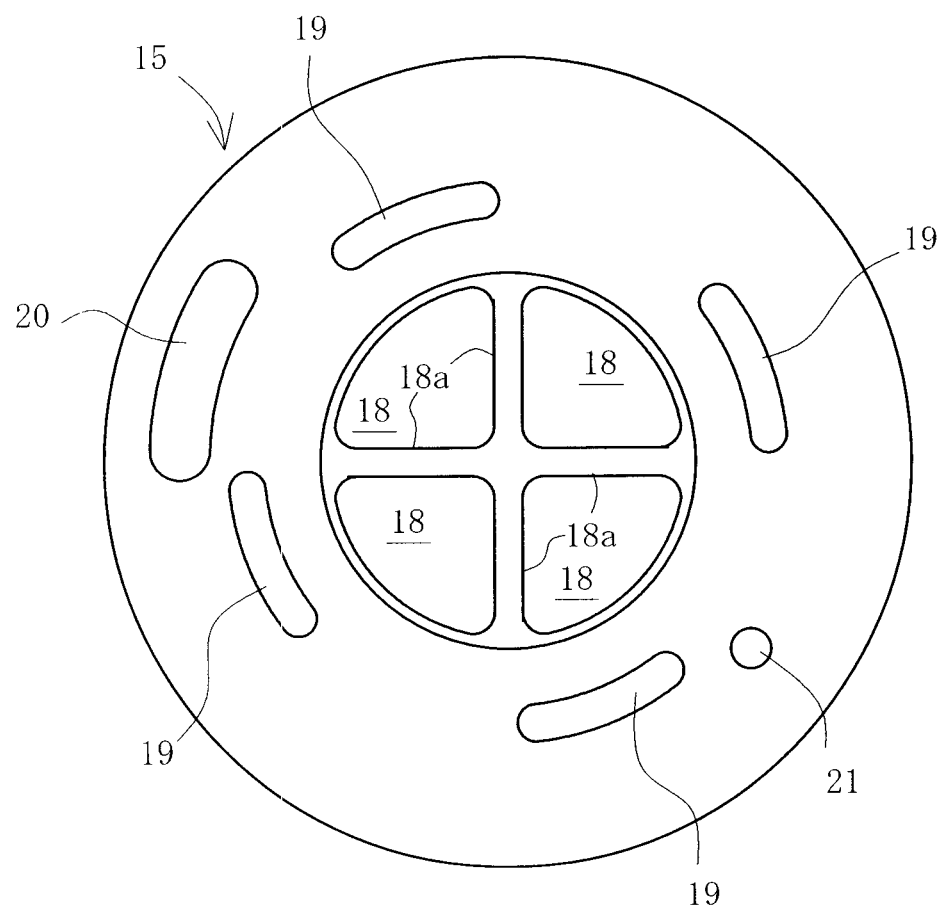
FIG. 3 is a plan view of an upper plate.

FIG. 3 is a plan view of the upper plate 15. The upper central opening 18 is provided in the central step portion 17 and divided equally into quarters by a cross-shaped deformation control frame 18a. The leak holes 19 provided corresponding to each of the partitioned upper central openings 18 are formed in an arc shape on the outer peripheral sides of each of the openings in such a manner that at the time of relief a greater amount of the hydraulic liquid than the one passing via the orifice passage 8 can be leaked through each of the leak holes 19. The reference character 20 denotes an opening of the orifice passage 8 on the side of the primary liquid chamber 5 to be in communication with the orifice passage 8.

Figure 4:
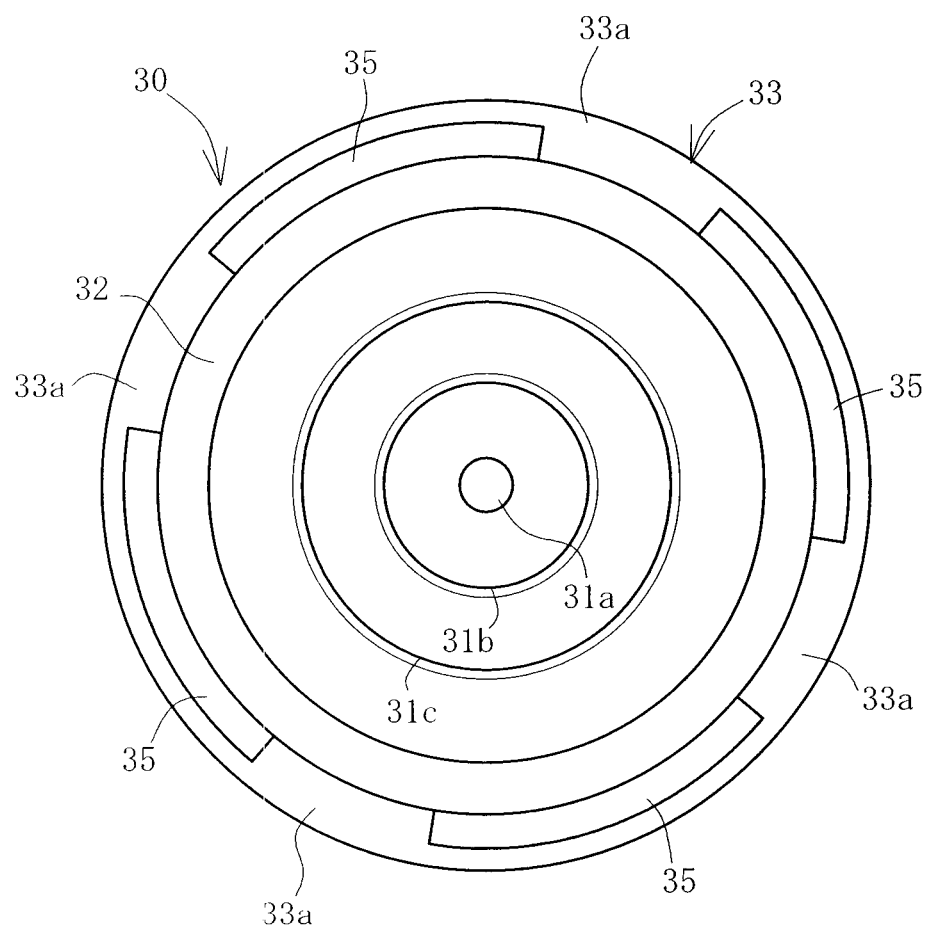
FIG. 4 is a plan view of an elastic diaphragm.
Figure 5:
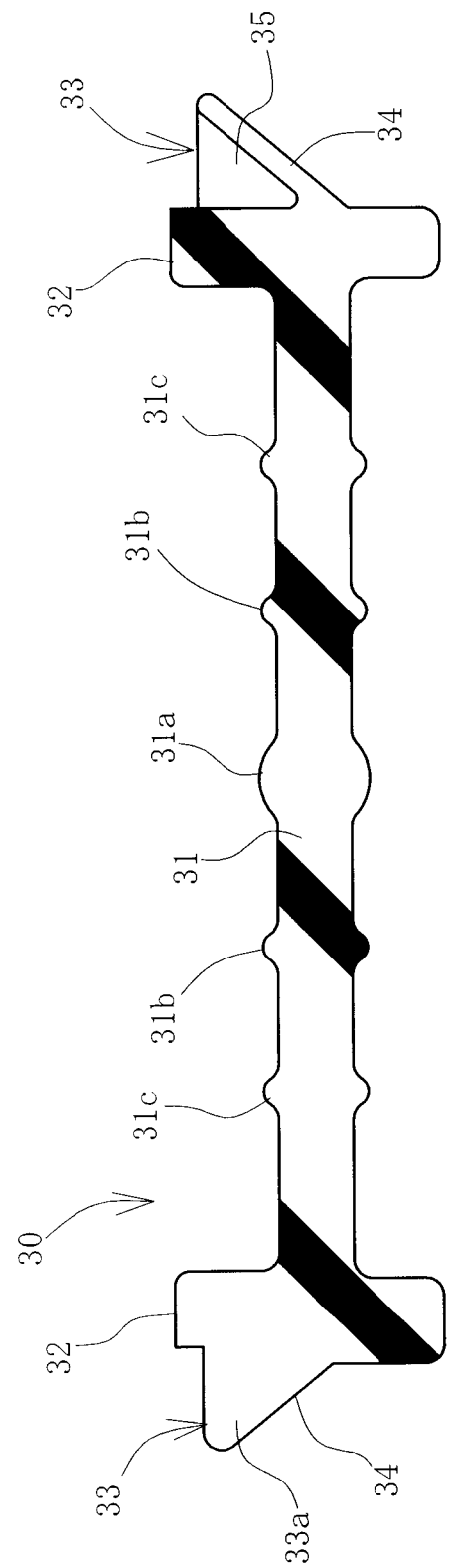
FIG. 5 is a cross sectional view in the diametric direction of the elastic diaphragm.

FIG. 4 is a plan view of the elastic diaphragm 30, and FIG. 5 is a cross sectional view of the elastic diaphragm 30 taken in the diametric direction. As shown in these drawings, the central thin wall portion 31 is formed integral with a plurality of concentrically provided bosses 31a and protrusions 31b, 31c so as to initially come into contact at a small contact area with the upper plate 15 and the lower holder 16 when the central thin wall portion 31 is elastically deformed. Herein, the elastic diaphragm is not necessarily required to be in a circle shape but it can be made in various shapes such as a polygonal shape or the like. In addition, the shape of the relief valve 33 can be variously modified in accordance with the shape of the elastic diaphragm 30.

The relief valve 33 is formed in the shape of a ring along the outer periphery of the central thin wall portion 31 and substantially in the shape of a triangle in cross section, whereby the thin tip end portion is easy to be deformed when pushed by the hydraulic liquid from the side of the secondary liquid chamber 7. The tip end portion is in close contact with the inner surface of the annular partition wall 23 in the normal position thereof so as to be in a valve closing state of shutting off the communication between leak holes 19 and 29. When the internal pressure of the main liquid chamber 5 turns the predetermined level approaching the negative pressure, the tip end portion is separated from the annular partition wall 23 thereby being turned to the valve opening state of communicating between the leak holes 19 and 29. The level of the internal pressure in the primary liquid chamber 5 as a reference of the valve opening time can be freely adjusted by the hardness of the relief valve 33. If considering that the cavitation phenomenon is caused by the negative pressure within the primary liquid chamber 5, it is preferable to set a value limitlessly close to the negative pressure as the predetermined level, such as to set it to open at about 0.1 atm, for example.

More than one recessed portion 35 is formed on an area of the relief valve 33 at even intervals in the circumferential direction (in this embodiment, four recessed portions at)90°. The recessed portion 35 is formed in the shape of a long arc in the circumferential direction at the width of about 45°. Between the neighboring recessed portions 35 and 35 there is formed a solid thick wall portion 33a of a substantially triangular shape in cross section (see FIG. 5). One or more recessed portions 35; preferably, a plurality of recessed portions are provided. Due to this recessed portion 35 the relief valve 33 has the difference in rigidity created in the circumferential direction thereof. Namely, the portion forming the recessed portion 35 is thin and soft while other portion is thick and hard. Due to this difference in rigidity, the hydraulic liquid at the time of leakage is concentrated onto the recessed portion 35 to be easily deformed, so as to surely start leakage from the recessed portion 35, whereby the opening of the relief valve 33 is carried out accurately. The degree of the difference in rigidity can be freely set, and the hardness of the recessed portion 35 can be adjusted by the number, the width to be formed, the thickness, etc. of the recessed portion 35.

Figure 6:
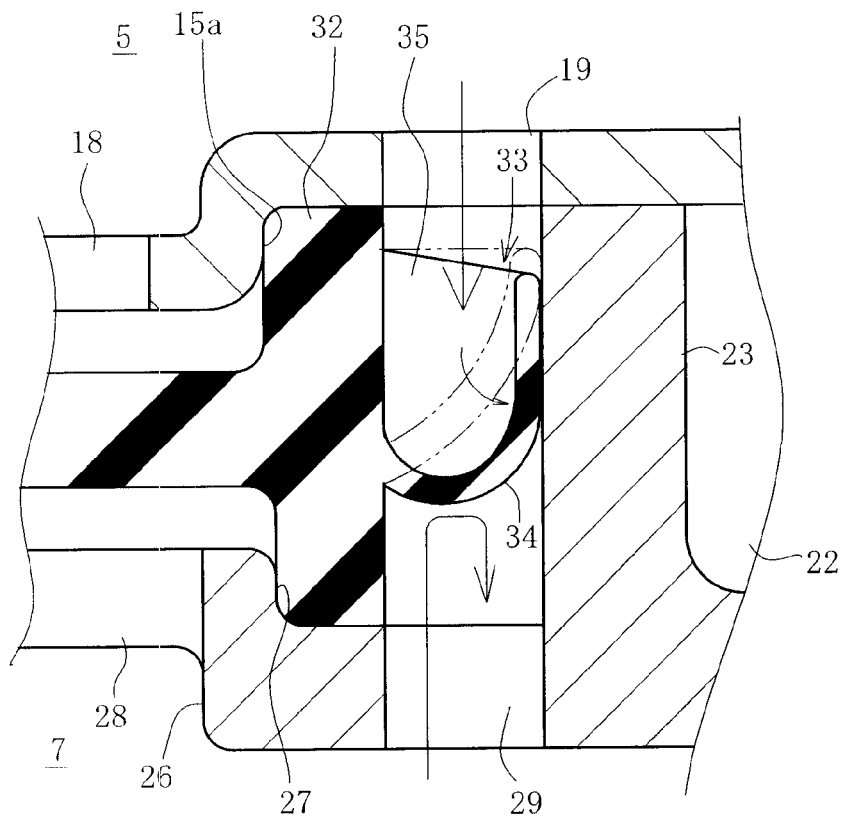
FIG. 6 is a cross sectional view showing a neighboring portion of a relief valve at the time of no leakage.
Figure 7:
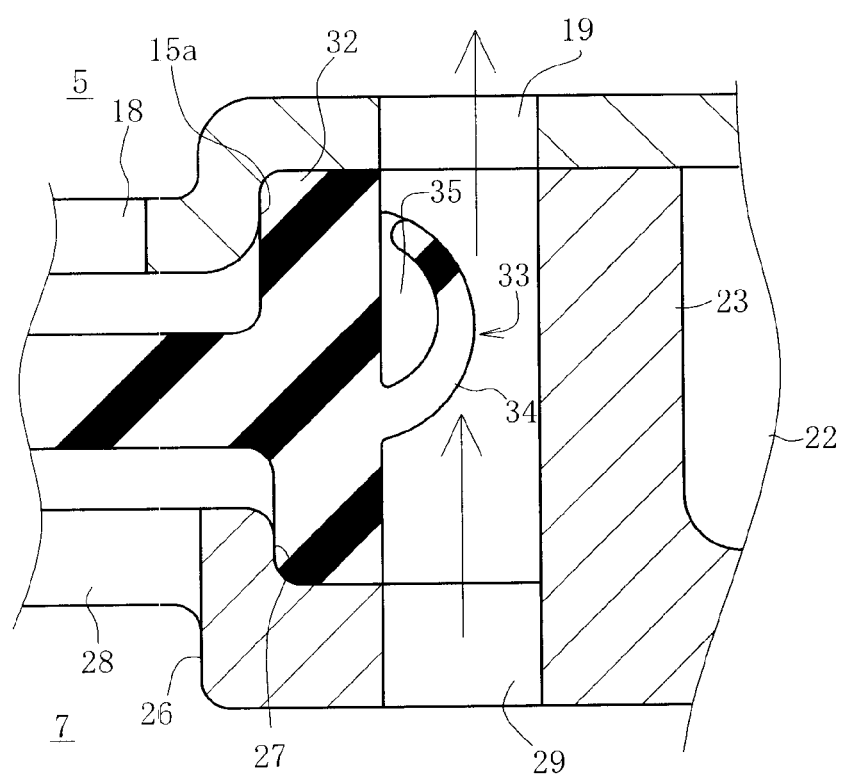
FIG. 7 is a cross sectional view showing a state at the time of leakage in the portion similar to FIG. 6.

Next, the operation of this embodiment will be explained. FIG. 6 is a cross sectional view showing a neighboring portion of the relief valve 33, and FIG. 7 is a similar view at the time of leakage. Firstly, when the great vibration is inputted to the first mounting member 1 in the direction of Z, the primary liquid chamber 5 is compressed to have the hydraulic liquid flown out to the side of the secondary liquid chamber 7. The hydraulic liquid in the primary liquid chamber 5 is pressurized to push the upper surface of the relief valve 33 downwardly to the side of the secondary liquid chamber 7, as shown in FIG. 6.

Then, since the outer peripheral portion of the relief valve 33 is previously pressed against the inner periphery of the annular partition wall 23, it is tightly contacted with to the annular partition wall 23 so as to increase the sealing property. Moreover, since the thin and deformable recessed portion 35 is deformed to be swelled out downwardly by the pressure of the hydraulic liquid, the outer peripheral portion increases the degree of contact further so as to prevent the leakage from the leak hole 19 to the leak hole 29. In this way, the leakage is prevented at the time of the pressurization of the primary liquid chamber 5 whereby the pressure of the hydraulic liquid is properly attenuated by the elastic deformation of the central thin wall portion 31 and the liquid column resonance through the orifice passage 8.

Thereafter, when the vibration direction reverses to have the insulator 3 deformed so as to return to the original state, the volume of the primary liquid chamber 5 returns to the state before the compression. However, since the hydraulic liquid moves through the orifice passage 8, the return is delayed so that the inside of the primary liquid chamber 5 approaches instantaneously the state of the negative pressure. This state is shown in FIG. 7. The relief valve 33 is pulled from the side of the primary liquid chamber 5 while the hydraulic liquid on the side of the secondary liquid chamber 7 pushes the relief valve 33 strongly so as to push up the tip end of the relief valve 33 by being led along the inclined wall 34. Therefore, the relief valve 33 starts deformation to be gradually turned up from the side of the tip end, and then, when the pressure due to the difference in the liquid pressure between the primary liquid chamber 5 and the secondary liquid chamber 7 exceeds the rigidity of the relief valve 33, is separated from the annular partition wall 23 to have valve opened, whereby the hydraulic liquid on the side of the secondary liquid chamber 7 is leaked from the secondary liquid chamber 7 through the leak hole 29 and the leak hole 19 to the primary liquid chamber 5.

Then, the large amount of the hydraulic liquid is leaked smoothly from the leak hole 19, so that the generation of the cavitation phenomenon within the first liquid chamber 5 can be surely prevented. Also, since the leakage is caused at the whole of the outer peripheral portion of the relief valve 33, and the relief valve 33 located on the outer peripheral portion of the annular partition wall 23 has a long peripheral length and a wide open area, the large amount of the hydraulic liquid can be leaked instantaneously, whereby the generation of the cavitation phenomenon can be effectively prevented.

Further, since the relief valve 33 has the difference in rigidity by providing the recessed portion 35, the pressure of hydraulic liquid exerting the influence on the relief valve 33 becomes uneven to easily concentrate the hydraulic liquid on the recessed portion of low rigidity thereby start leaking there, so that the accurate valve opening can be ensured. Accordingly, the working accuracy of the relief valve 33 can be increased. With this rigidity difference structure, it is possible to fully cope with the input of the vibration of great amplitude of more than ±10 mm. Then, the difference in rigidity of the relief valve 33 is not necessarily provided by the recessed portion 35 but can be done by other means such as a thickness change, rib formation, or the like. Further, there may be the case where the difference in rigidity is not provided but is to be even. Furthermore, the inclined surface 34 is not limited to the straight shape but can be formed in an optional shape such as a curved shape or the like.

Also, since the relief valve 33 is integrally provided on the outer periphery of the fixing portion 32 functioning as the restraint portion, it is easily formed, and it is possible to save the space for arrangement and thereby to improve the space efficiency. Moreover, since the relief valve 33 is functionally differentiated from the central thin wall portion 31 by the fixing portion 32, it can be easily set.

Further, since when the primary liquid chamber 5 is pressurized, the tip end of the relief valve 33 is closely contacted with the inner surface of the annular partition wall 23 by the liquid pressure on the side of the primary liquid chamber 5 and, when the primary liquid chamber 3 turns the predetermined level close to the negative pressure, is opened positively, it is possible to minimize the decrease in the damping performance while effectively controlling the generation of the cavitation phenomenon. Then, the relief valve 33 is initially set to be in contact with the annular partition wall 23 except at the time of valve opening, thereby making it possible to promote the effect of the damping performance as above.

Figure 8:
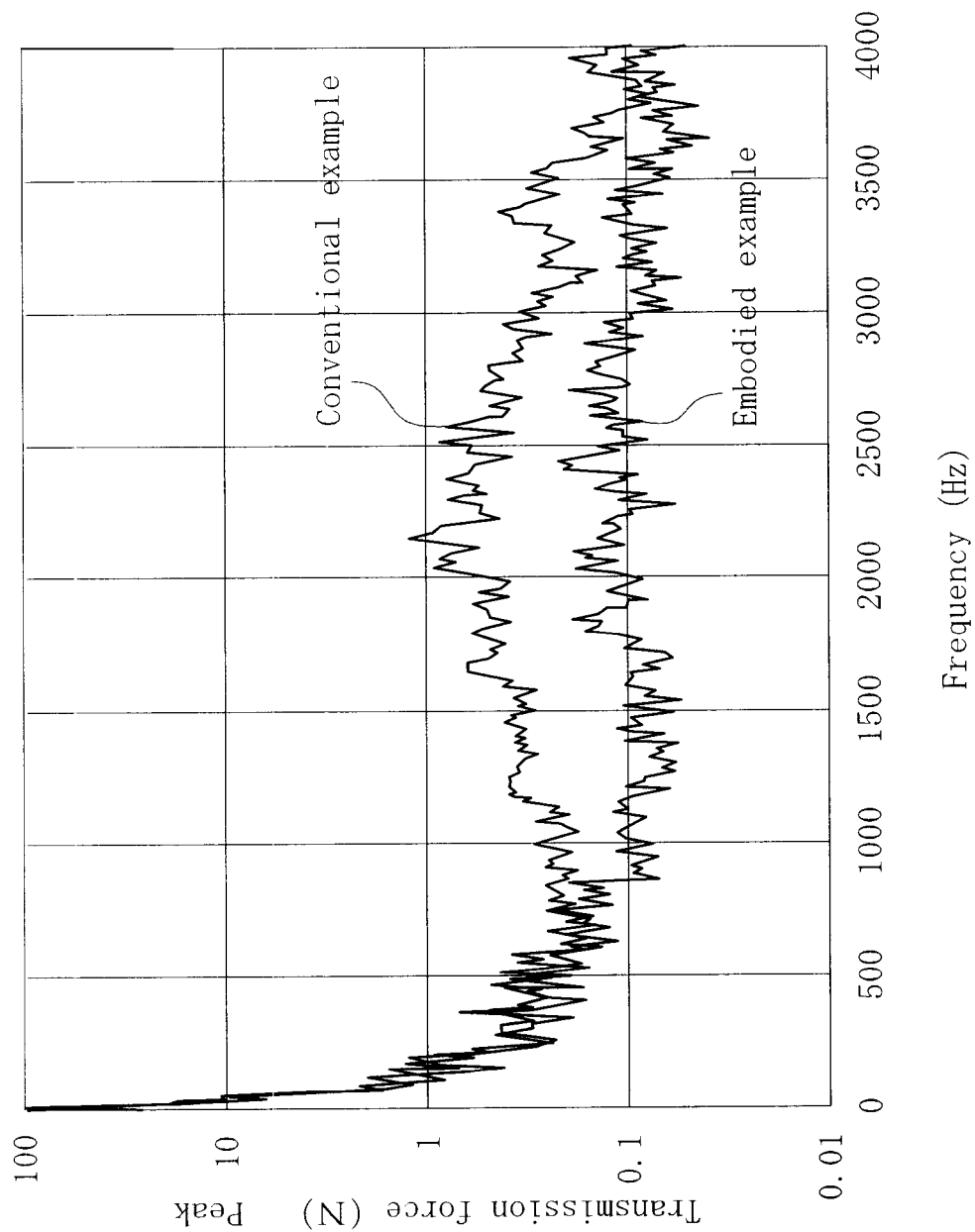
FIG. 8 is a graph showing a vibration transmission characteristic.

FIG. 8 is a graph showing a vibration transmission characteristic, wherein the horizontal axis shows a constitutive frequency (Hz) obtained by frequency-analyzing the transmission vibration, and the vertical axis shows on a logarithmic scale a transmission force (N) that is a magnitude when the vibration is transmitted from the first mounting member 1 to the second mounting member 2. In this example, there are frequency-analyzed the frequency vibrations in the case of exciting at 13 Hz the engine mount according to this embodiment and a conventional example of similar structure without the relief valve, respectively. There is shown the transmission state of component vibration in a wide frequency range, indicating that the vibration is hard to be transmitted as the transmission force is decreased. In this graph, there is a remarkable difference in the transmission force between the conventional example having no relief valve of the present invention and the embodied example, with respect to the vibration of 200 Hz or more. From the fact that the transmission force is decreased in the embodied example, it is understood that the generation of the vibration component in this frequency range is prevented.

Namely, there is a case where an unspecified large number of vibration components comprising for example 700 Hz to thousands Hz as the vibration of 200 Hz or more are created due to the cavitation phenomenon. From the fact on the graph showing that the creation of such vibration components is prevented, it is understood that the generation of the cavitation phenomenon is effectively prevented. It is also apparent that since the difference in the structure between the embodied example and the conventional example is only whether or not the relief valve is provided, the reason that the generation of the cavitation phenomenon is prevented is due to the leakage of the relief valve.

FIG. 1, FIG. 2, FIG. 6, FIG. 7 and FIG. 9 to FIG. 21 concern the second embodiment of the present invention. Herein, with respect to the structure similar to the previously described embodiments, like parts are given like reference characters and the explanation will be omitted (the same in each of the following embodiments).

In the following explanation, an upward and downward direction is expressed based on an illustrated state in FIG. 1 and a right and left direction is done based on an illustrated state in FIG. 9. Also, with respect to the structure similar to the previously described embodiment, like parts are given like reference characters and the explanation will be partially omitted.

Referring now to these drawings, the partition member 6 comprises the upper plate 15 and the lower holder 16 which are separated upwardly and downwardly. The elastic diaphragm 30 is held in a middle position between the upper plate 15 and the lower holder 16. The orifice passage 8 is provided radially outwardly of the elastic diaphragm 30 (see FIG. 1). On the outer peripheral portion of the elastic diaphragm 30 there is provided the relief valve 33 for opening and closing a leak passage which communicates between the leak hole 19 on the side of the primary liquid chamber 5 and the leak hole 29 on the side of the secondary liquid chamber 7 so as to leak the hydraulic liquid from the side of the secondary liquid chamber 7 to the side of the primary liquid chamber 5 when the relief valve 33 is opened. Further, the elastic diaphragm 30 faces the primary liquid chamber 5 and the secondary liquid chamber 7 each through the upper central opening 18 of the upper plate 15 and the lower central opening 28 of the lower holder 16 so as to be elastically deformed by the fluctuation of the liquid pressure in the primary liquid chamber 5 to absorb the fluctuation of internal pressure.

FIG. 9 is a plan view of the partition member 6, FIG. 10 is a cross sectional view taken along line 10-O-10 of FIG. 9 and FIG. 11 is a cross sectional view taken along line 11-O-10. As shown in these drawings, the partition member 6 takes the form of a hollow frame-shaped body having a circular shape in a plan view. The upper plate 15 and the lower holder 16 each has rigidity and are formed of proper materials such as light metal, hard resin, etc. The upper plate 15 is formed in the shape of a disk and is lowered a step on the central side thereof to form the central step portion 17 in which the upper central opening 18 communicating with the primary liquid chamber 5 is formed. The upper plate 15 is partitioned by the cross-shaped deformation control frame 18a. On the outer peripheral side of the central step portion 17 there are arranged four leak holes 19 formed in an arc-shaped long hole, at even intervals of 90° on the same circumference.

The reference character 20 denotes the opening of the orifice passage 8 on the side of the primary liquid chamber 5. The reference characters 21 denote the positioning projections projecting from the lower holder 16, and when they are fitted into small bores 21a formed in the upper plate 15, the upper plate 15 and the lower holder 16 are fixed in position and united each other. The upwardly opened arc-shaped groove 22 is provided on the outer periphery of the lower holder 16 to form the orifice passage 8. The elastic diaphragm 30 is accommodated in an inner space surrounded by the annular partition wall 23 forming the inside wall of the groove 22. In the central area of the bottom portion 25 of the lower holder 16 there is formed the lower central opening 28 being in communication with the secondary liquid chamber 7. The reference character 28a denotes a cross-shaped deformation control frame.

The elastic diaphragm 30 has the central thin wall portion 31, the fixing portion 32 and the relief valve 33 formed integral with the outer peripheral side of the fixing portion 32. The central thin wall portion 31 faces the upper central opening 18 and the lower central opening 28, and is elastically deformed by the hydraulic liquid flowing in and out though these openings in such a manner that the excessive deformation is controlled by the cross-shaped deformation control frames 18a and 28a.

As shown in FIG. 10, a portion of the fixing portion 32 forms a super thick wall portion 40 having the thickest wall and the highest rigidity and functions as a rotation arresting means of the elastic diaphragm 30 when fitted into an accommodation recess 41 formed on the lower holder 16 and held between the upper plate 15 and the lower holder 16 from upper and lower sides. Further, in the vicinity of the lower portion 32a there is formed an engaging portion 42 (see FIG. 13) adapted to be engaged with a step-shaped wall portion formed on the accommodation recess 41, thereby to also arrest the rotation here. As shown in FIG. 11, there is also formed a thick wall portion 43 in the vicinity of the super thick wall portion 40. This thick wall portion 43 is formed in a substantially triangular shaped cross section having an inclined wall 44 such that the lower side of the super thick wall portion 40 is cut out obliquely, and is housed in an accommodation recess 45 (see FIG. 17) located in the vicinity of the accommodation recess 41.

FIG. 6 and FIG. 7 are cross sectional view for explaining an operation of the relief valve, wherein FIG. 6 shows a neighboring portion of the relief valve 33, and FIG. 7 is a similar view at the time of leakage. The relief valve 33 has the inclined wall 34 which corresponds to the wall forming the recessed portion 35 on the upper side and making the inclined wall 44 thin with respect to the thick wall portion 43, and is adapted to be opened and closed by the deformation of this part. The relief valve 33 is so arranged that the recessed portion 35 faces the leak hole 19 while the inclined surface 34 faces the leak hole 29. The leak passage 39a in communication with the leak holes 19 and 29 is formed between the outer peripheral portion of the elastic diaphragm 30 and the annular partition wall 23. The leak passage 39a constitutes a channel of the hydraulic liquid passing through the partition member 6 and is opened and closed by the relief valve 33.

Figure 12:
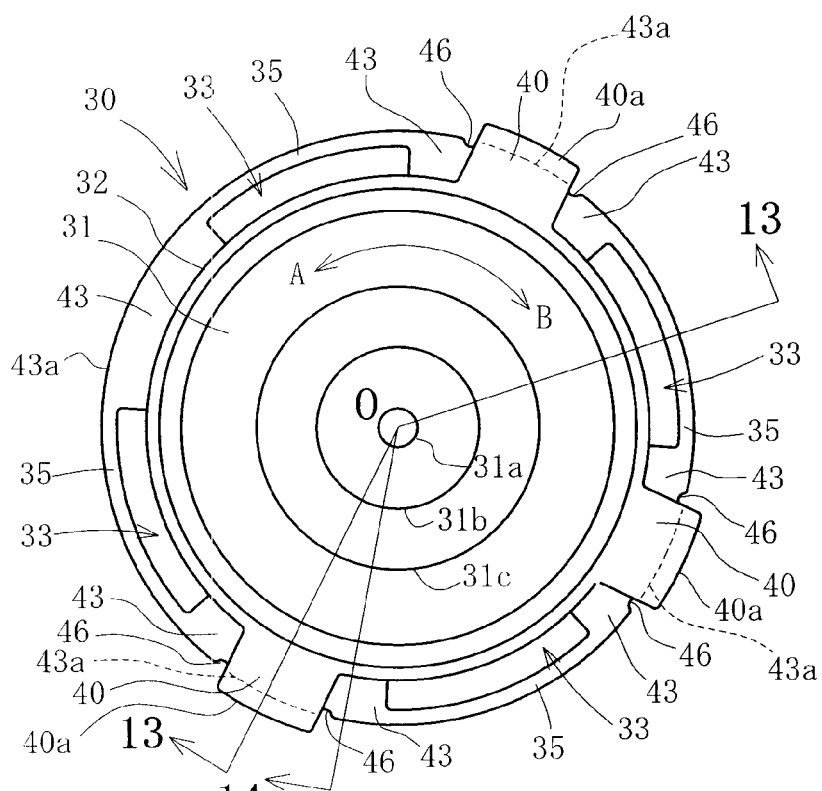
FIG. 12 is a plan view of an elastic diaphragm.
Figure 13:
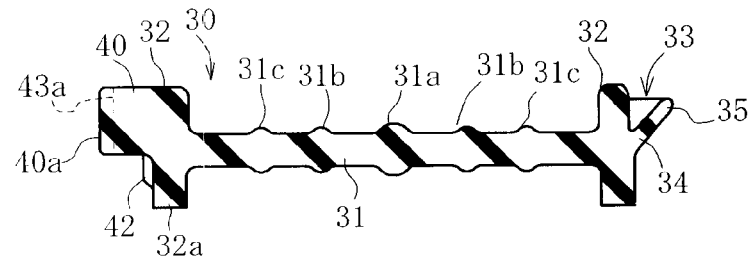
FIG. 13 is a cross sectional view taken along line 13-O-13 of FIG. 12.
Figure 14:
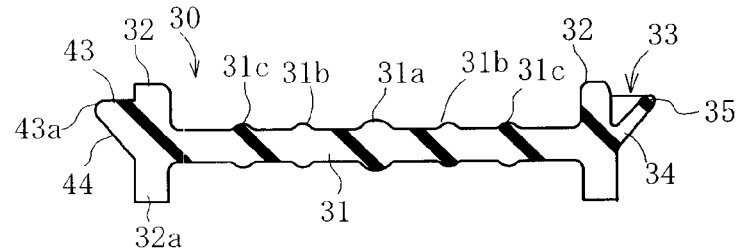
FIG. 14 is a cross sectional view taken along line 14-O-13 of FIG. 15.

FIG. 12 is a plan view of the elastic diaphragm 30, FIG. 13 is a cross sectional view taken along line 13-O-13, and FIG. 14 is a cross sectional view taken along line 14-O-13. In these drawings, the elastic diaphragm 30 is formed of a proper elastic body such as rubber or the like to constitute a member for absorbing the internal pressure fluctuation of the primary liquid chamber 5. On the outer periphery of the elastic diaphragm 30 there is provide the fixing portion 32 formed with an annular wall on the outer periphery thereof while in the radially outward direction of the fixing member 32 there is concentrically protruded the thick wall portion 43. On a portion of this thick wall portion 43, the recessed portion 35 which is formed in the shape of an arc in a plan view and extends in the circumferential direction is provided so as to form the thinned relief valve 33 at intervals of 90°. Then, the thick wall portion and the relief valve 33 are formed alternately in the circumferential direction. The super thick wall portions 40 are formed integral with three thick wall portions among four thick wall portions 43.

The super thick wall portion 40 is provided with an extended protrusion 40a which is protruded further radially outwardly of a tip end 43a of the thick wall portion 43. On each portion connected with outer peripheral portions of the right and left thick wall portions 43 there are formed curved recesses 46 (see FIG. 12) which are cut radially inwardly to alleviate the stress applied to between the super thick wall portion 40 and the thick wall portion 43 when the elastic diaphragm 30 is rotatively moved in the direction of arrow A or B.

Although the width in the circumferential direction of the super thick wall portion 40 is about a half of the thick wall portion 43 (located on the left side in the drawing) having no super thick wall portion 40, the super thick wall portion 40 is projected radially outwardly in a substantially rectangular cross section as shown in FIG. 13, so that it has an area almost twice as much as the thick wall portion 43 of a triangular cross section as shown in FIG. 14. Moreover, since the cross sectional area is still larger than the thick wall portion 43 by the extended protrusion 40a, the volume is greater than the thick wall portion 43 thereby to obtain a higher rigidity.

The central thin wall portion 31 is formed integral with a plurality of concentrically provided bosses 31a and protrusions 31b, 31c to initially come into contact at a small contact area with the upper plate 15 and the lower holder 16 when the central thin wall portion 31 is elastically deformed.

The tip end portion of the relief valve 33 which is thinned by forming the cross section in a triangular shape is easy to be deformed when pushed by the hydraulic liquid from the secondary liquid chamber 7.

Since the relief valve 33 is a thin wall portion formed by cut out a portion of the thick wall portion to be formed in itself all around the periphery, the difference in rigidity is created between the thick wall portion 43 and the relief valve 33 in the outer peripheral portion of the elastic diaphragm 30 when the thin relief valve 33 and the thick wall portion 43 are formed alternately in the circumferential direction. Namely, the relief valve 33 is thin and soft while other portion formed by the thick wall portion 43 is hard. Due to this difference in rigidity, the hydraulic liquid at the time of leakage is concentrated onto the relief valve 33 to have the inclined surface 34 of the relief valve 33 deformed first to surely start leakage, whereby the opening of the relief valve 33 is carried out accurately. The degree of the difference in rigidity can be set freely, and the hardness of the recessed portion 35 can be adjusted by the number, the width to be formed, the thickness, etc. of the recessed portion 35.

Figure 15:
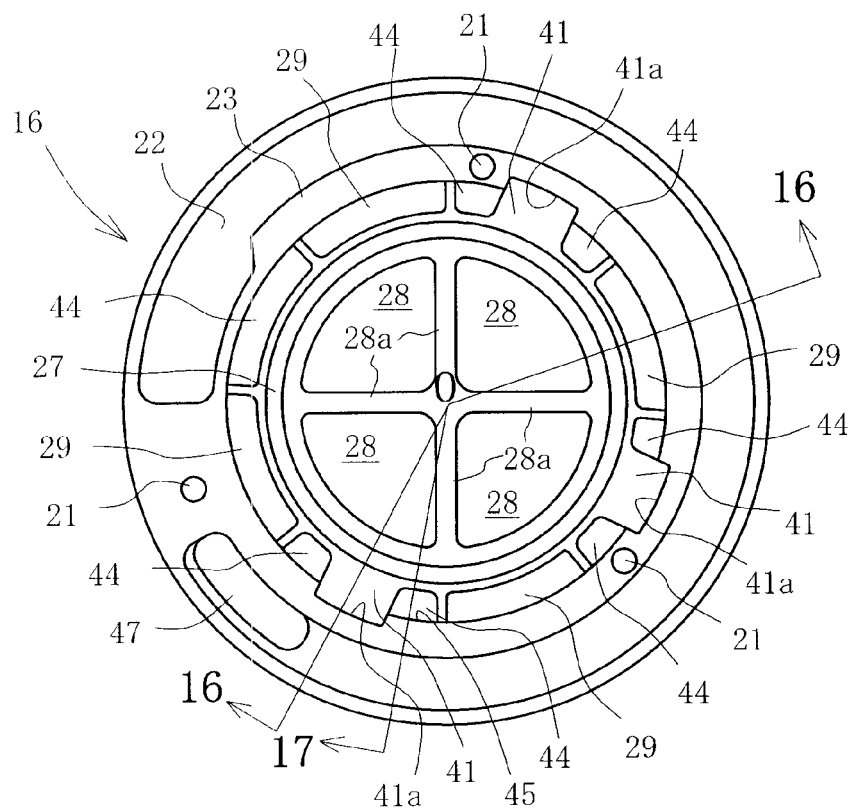
FIG. 15 is a plan view of a lower holder.
Figure 16:
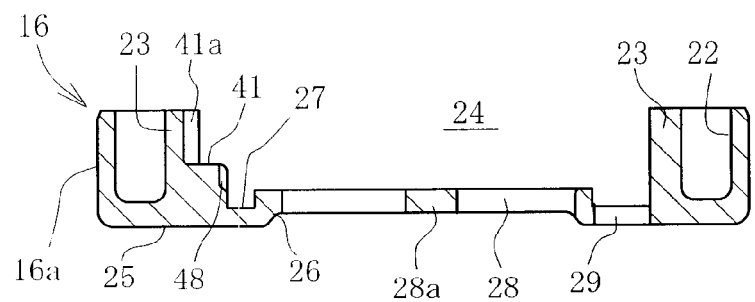
FIG. 16 is a cross sectional view taken along line 16-O-16 of FIG. 15.
Figure 17:
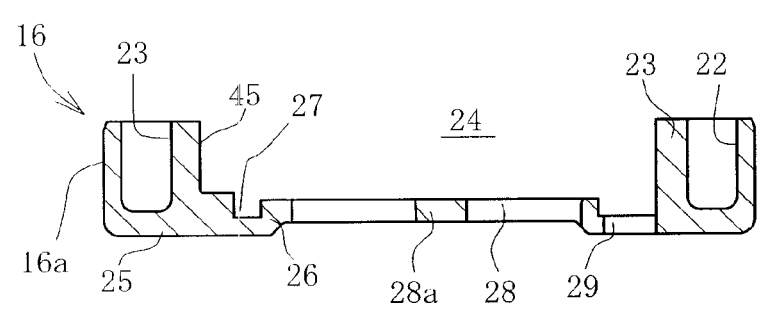
FIG. 17 is a cross sectional view taken along line 17-O-16 of FIG. 15.

FIG. 15 is a plan view of the lower holder 16, FIG. 16 is a cross sectional view taken along line 16-O-16 of FIG. 15, and FIG. 17 is a cross sectional view taken along line 17-O-16 of FIG. 15. The lower holder 16 is a rigid material formed of resin or metal and has an outer peripheral wall 16a and the bottom portion 25. Also, the lower holder 16 is an upwardly opened vessel-shaped member and is formed with the upwardly opened arc-shaped groove 22 for forming the orifice passage 8 inside of the peripheral wall 16a. The arc-shaped groove 22 almost makes a round and leads to an opening 47 on the side of the secondary liquid chamber 7. The upwardly opened central recessed portion 24 is provided inside of the annular partition wall 23 forming the inside wall of the arc-shaped groove 22.

The bottom portion 25 is upwardly heightened a step on the central side thereof to form the step portion 26. Adjacent to this step portion 26 and on an outer peripheral side thereof there is provided the annular groove 27. Also, in a central area of the bottom portion 25 there is fowled the lower central opening 28 which is in communication with the secondary liquid chamber 7 and which is partitioned by the cross-shaped deformation control frame 28a. Inside of the annular partition wall 23 of the bottom portion 25, the leak hole 29 and the accommodation recess 45 are formed alternately in the circumferential direction. Then, the accommodation recesses 41 for the super thick wall portion 40 are integrally provided on three accommodation recesses 45, corresponding to the thick wall portions 43 provided with the super thick wall portion 40, among four accommodation recesses 45. The accommodation recess 41 is formed with a radially enlarged portion 41a which is formed by recessing the radially outward portion of the accommodation recess 41 toward the thick wall of the annular partition wall 23 and into which the extended protrusion 40a (see FIG. 12) of the super thick wall portion is fitted.

Figure 20:
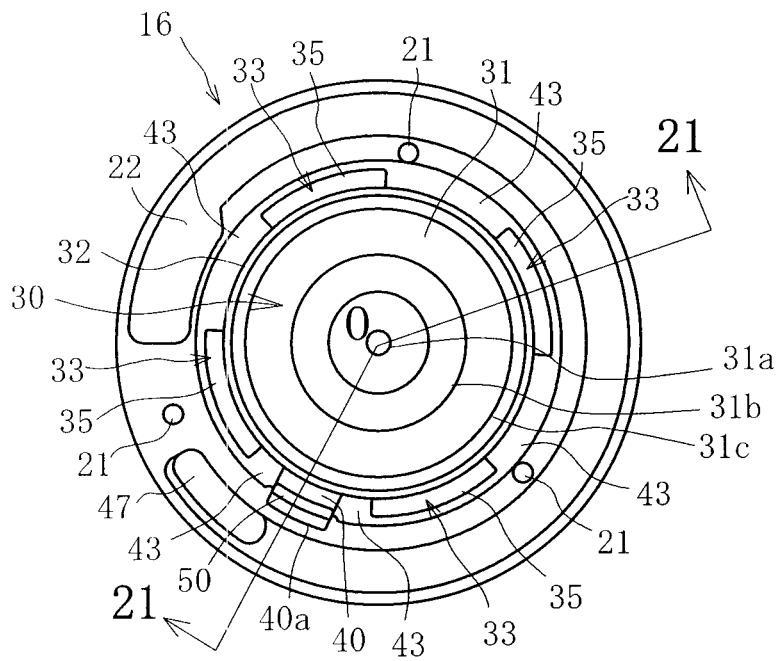
FIG. 20 is a plan view showing the state of accommodating the elastic diaphragm into the lower holder.

As shown in FIG. 16, the accommodation recess 41 is formed in a substantially step-shape between the annular partition wall 23 and the annular groove 27. On the wall surface portion of the annular groove 27 there is formed an engaging groove 48 to be engaged with the engaging portion 42 (see FIG. 13). As shown in FIG. 20, the annular partition wall 23 facing the accommodation recess 45 is thicker by the thickness of the radially enlarged portion 41a not provided thereon.

Figure 18:
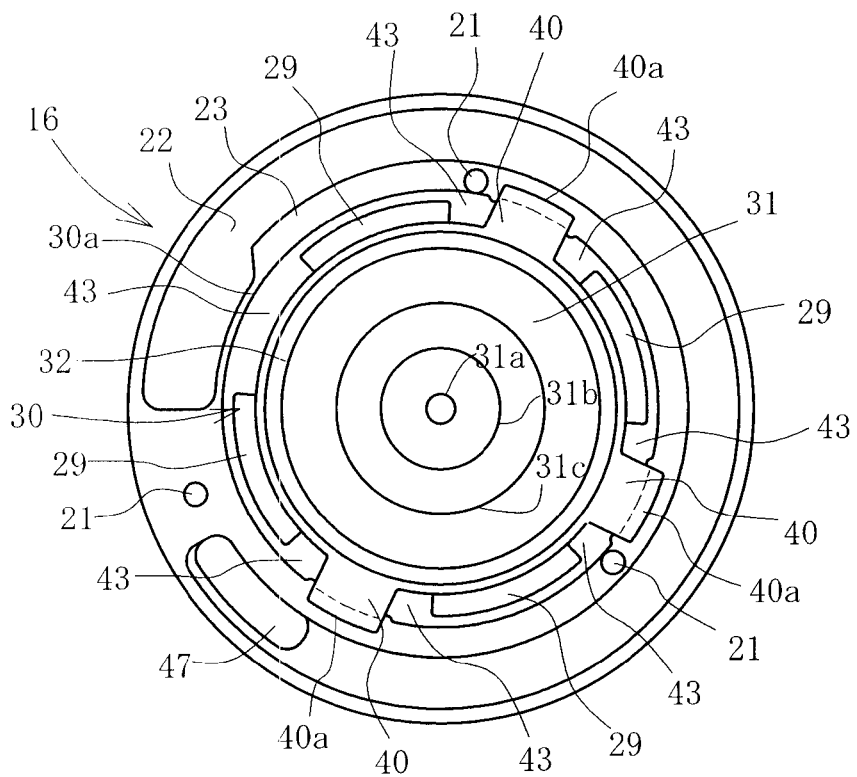
FIG. 18 is a plan view showing the state of accommodating the elastic diaphragm in the lower holder.

FIG. 18 is a plan view showing the state of accommodating the elastic diaphragm 30 in the lower holder 16. As shown in this drawing, an outer peripheral edge 43a of the thick wall portion 43 except the super thick wall portion 40 is in contact with the inner wall of the annular partition wall 23, and the extended protrusion 40a is protruded into the thick wall of the annular partition wall 23 by the thickness of the super thick wall portion 40. The upper portions of the super thick wall portion 40 and the thick wall portion 43 are pressed by the upper plate 15, and only the upper portion of the relief valve 33 faces the leak hole 19, whereby the super thick wall portion 40 and the thick wall portion 43 are pressed and fixed by the upper plate 15, so that the relief valve 33 can be opened and closed through the liquid pressure (see FIG. 10 and FIG. 11).

Further, as apparent from the drawings, since the super thick wall portion 40 is fixed on the annular partition wall 23 in the radially outward position of the relief valve 33, the deformation in the circumferential direction of the relief valve 33 is more accurately prevented.

Next, the operation of this embodiment will be explained hereunder. In FIG. 6, when the vibration of various amplitude is inputted to the primary liquid chamber 5 and the liquid pressure is applied to the relief valve 33 through the leak hole 19, the relief valve 33 is opened at the time of generation of the negative pressure in the primary liquid chamber 5 by the given great amplitude (about PP3) to leak the hydraulic liquid, thereby preventing the cavitation phenomenon. However, when excited continuously at the great amplitude (about PP10), the elastic diaphragm 30 is rotatively moved within the partition member 6, so that the positional slippage is liable to be caused between the relief valve and the leak passage 39a connecting the leak holes 19 and 29 and passing through the partition member 6. The occurrence of this slippage decreases the competence to prevent the cavitation phenomenon at the amplitude greater than a certain level (about PP6).

However, in this embodiment, since the three super thick wall portions 40 of high rigidity are provided in the circumferential direction and fixedly held between the upper plate 15 and the lower holder 16, the elastic diaphragm 30 is prevented from rotational movement if the relief valve 33 undergoes the great liquid pressure repeatedly, thereby to position and hold the elastic diaphragm 30 so as not to cause the positional slippage between the relief valve 33 and the leak passage 39a. Therefore, the generation of the cavitation phenomenon is effectively prevented also in the severe condition that the vibrations of great amplitude are repeatedly inputted.

Moreover, since the super thick wall portion 40 is fitted into the accommodation recess 41 to position the elastic diaphragm 30 and the lower holder 16 while the lower holder 16 and the upper plate 15 are positioned by the positioning projections 21, three members of the upper plate 15, the elastic diaphragm and the lower holder 16 can be positioned easily and accurately so that the relief valve 33 and the leak passage 39 can be accurately positioned and assembled. Also, since the rigidity of the outer peripheral portion of the elastic diaphragm 30 can be increased by the super thick wall portion 40, the damping value against the inputted vibration is improved, and especially the damping value of great amplitude vibration (±1 mm or more) can be raised.

In addition, since the difference in rigidity between the relief valve 33 and other outer peripheral portion becomes large, the workability of the relief valve 33 can be further improved. Also, since simply the super thick wall portion 40 is provided on the outer peripheral portion of the elastic diaphragm 30 to be held between the upper plate 15 and the lower holder 16, it is possible to make the structure simple and to make the assembling easy, whereby inexpensive manufacturing can be materialized. Then, in place of being held between the upper plate 15 and the lower holder 16, the elastic diaphragm 30 can be also engaged at the outer peripheral portion thereof with either the upper plate 15 or the lower holder or both of these members.

Figure 19:
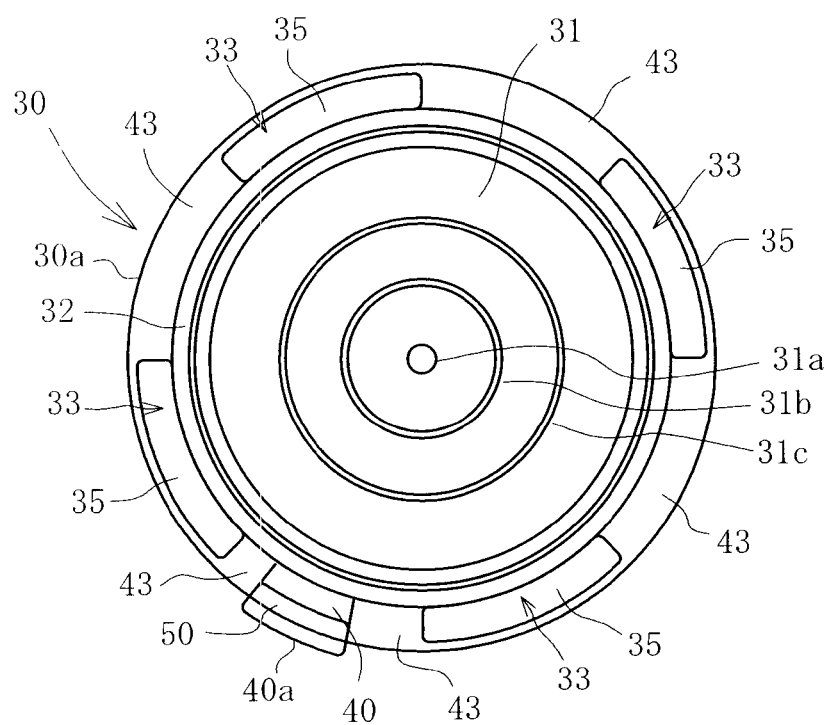
FIG. 19 is a plan view of the elastic diaphragm according to the third embodiment of the present invention.
Figure 21:
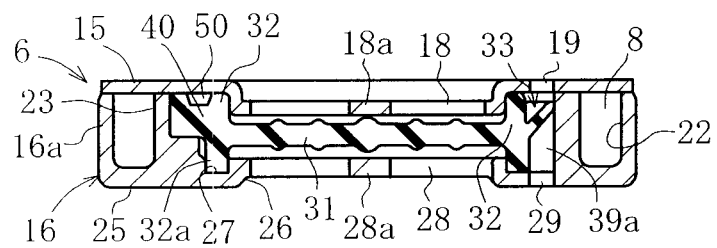
FIG. 21 is a cross sectional view taken along line 21-O-21 of FIG. 20.

Next, the third embodiment will be explained with reference to FIG. 19 to FIG. 21. FIG. 19 is a plan view of the elastic diaphragm, FIG. 20 is a plan view showing the state of accommodating the elastic diaphragm in the lower holder, and FIG. 21 is a cross sectional view taken along line 21-O-21 of FIG. 20. As shown in these drawings, a single super thick wall portion 40 is provided in this embodiment. Also, as shown in FIG. 21, a groove 50 extending in the circumferential direction is provided on the upper wall of the super thick wall portion 40 so as to secure the interference when fixing by the upper plate 15. In this way, number of the super thick wall portion 40 is optional if it is one or more, and in all cases, the effect similar to the previous described embodiment can be obtained.

Figure 22:
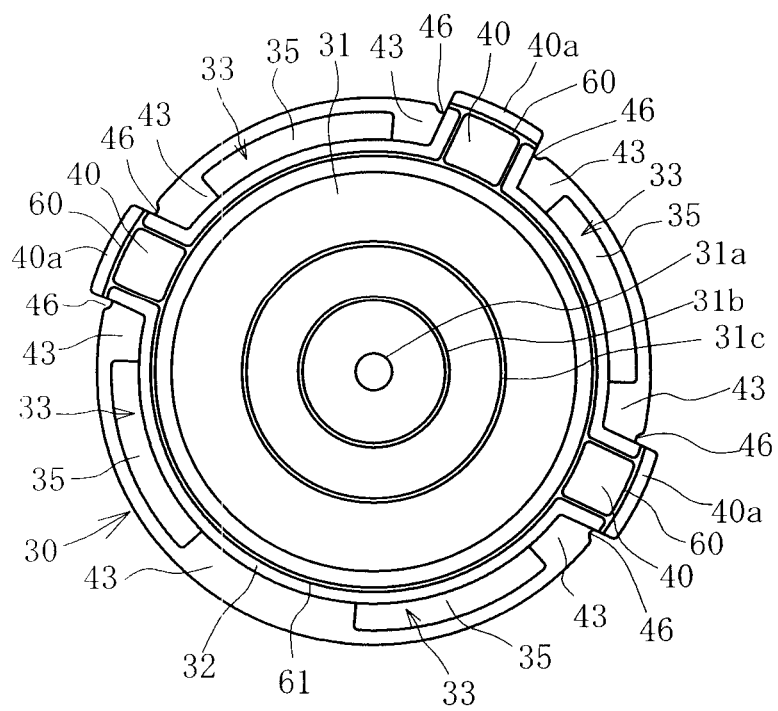
FIG. 22 is a plan view of the elastic diaphragm according to the fourth embodiment of the present invention.

FIG. 22 is a plan view of the elastic diaphragm 30 according to the fourth embodiment. Although three super thick wall portions 40 are provided in this embodiment similar to the second embodiment, a seal rib 60 extending along a periphery of an upper surface of the super thick wall portion 40 is projected from the upper surface of each of the super thick wall portion 40. On the surface of the fixing portion 32, a ring-shaped seal rib 61 is also formed along the fixing portion 32 in such a manner that this seal rib 61 is continuously connected to the seal rib 60 of the super thick wall portion 40. With this structure, the adhesiveness to the upper plate 15 is increased thereby making it possible to effectively prevent the liquid leakage. Especially, since the upper width of the annular partition wall 23 in this area is narrowed due to the extended protrusion 40a, it is possible to contribute to the improvement of the sealing performance against the upper surface area of the annular partition wall 23 in the vicinity of the extended protrusion 40a.

Figure 23:
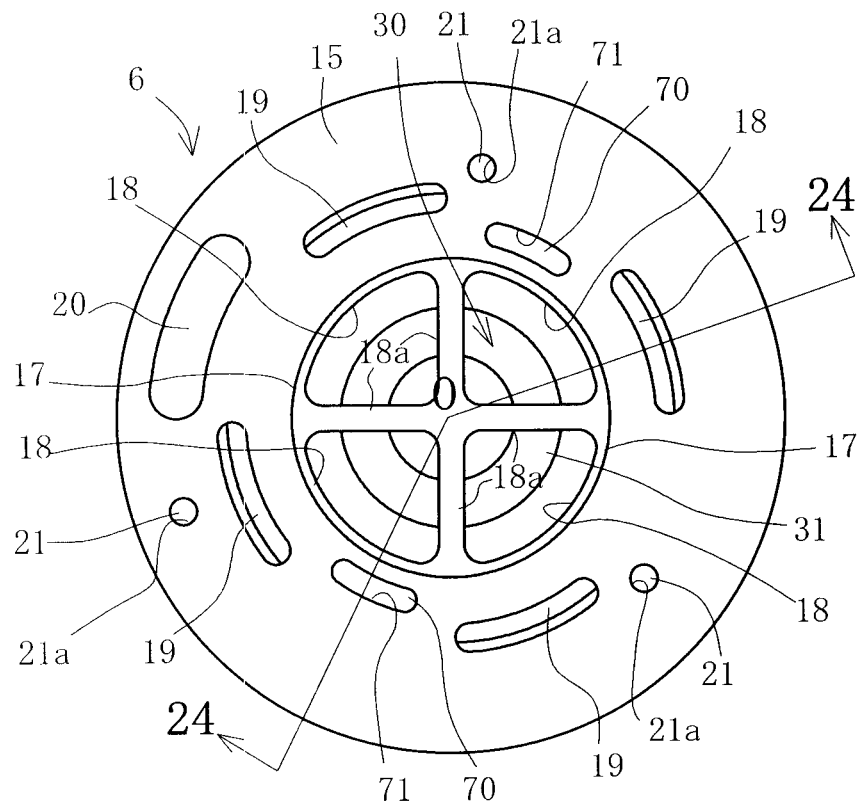
FIG. 23 is a plan view of the partition member in the assembled state, according to the fifth embodiment of the present invention.
Figure 24:
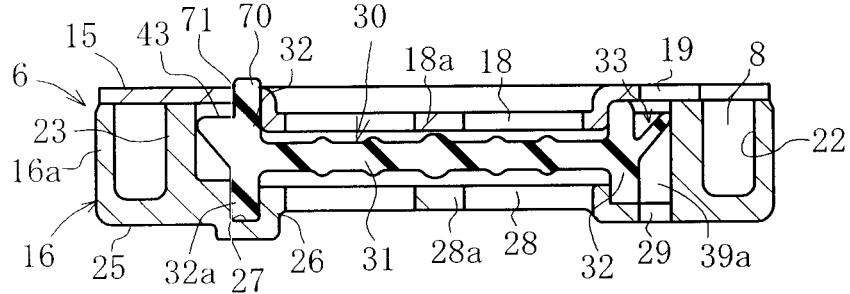
FIG. 24 is a cross sectional view taken along line 24-O-24 of FIG. 23.
Figure 25:
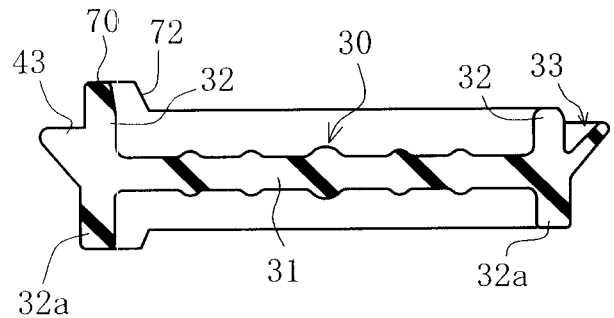
FIG. 25 is a view of the elastic diaphragm separated from the assembly of FIG. 24.

FIG. 23 to FIG. 25 concern the fourth embodiment, wherein FIG. 23 is a plan view of the partition member in the assembled state, FIG. 24 is a cross sectional view taken along line 24-O-24 of FIG. 25, and FIG. 25 is a view of the elastic diaphragm separated from the assembly of FIG. 24. As shown in these drawings, in place of the above mentioned super thick wall portion, an upper extended portion 70 extended upwardly and integrally projected from the fixing portion 32 is provided on the thick wall portion 43 and fitted into a positioning slot 71 provided on the upper plate 15. With this structure, the rotation of the elastic diaphragm 30 can be prevented without providing the super thick wall portion by having the upper extended portion 70 fitted into the positioning slot 71 of the upper plate 15. Also, more than one kind of the thick wall portion 43 is not required so as to make the structure simple. Then, an end portion 72 in the circumferential direction of the upper extended portion 70 which is a portion connecting between the upper surface of the fixing portion 32 and the upper extended portion 70 is tapered so that the fitting into the positioning slot 71 can be easily carried out.

While the invention has been described in its preferred embodiments, it is to be understood that the present invention is not limited to the above described embodiments, and that modifications and applications may be variously made within the scope and sprit of the invention. For example, the present invention may be applied to various kinds of items such a suspension mount, etc. besides the engine mount.

What is claimed is:
1. A liquid sealed vibration isolating device, comprising:
a first mounting member to be mounted on one of a couple of mounting counterparts,
a second mounting member to be mounted on the other of the mounting counterparts,
an insulator for connecting in a vibration isolating state between said first and second mounting members,
a primary liquid chamber using said insulator as a part of the wall thereof and being filled with a hydraulic liquid, and
a secondary liquid chamber being partitioned from said primary liquid chamber by a partition member and having at least a portion of a wall formed by a diaphragm,
wherein said partition member has a hollow frame member and an elastic diaphragm embedded within said frame member, said elastic diaphragm including a central portion, on an inner peripheral side, and a relief valve, on an outer peripheral side, that are formed integrally across an annular fixing portion, said central portion faces said primary liquid chamber and said secondary liquid chamber and is adapted to elastically deform so as to absorb pressure fluctuation of an internal pressure within said primary liquid chamber, said fixing portion is an annular wall surrounding an outer periphery of said central portion and supported by said frame member, said relief valve comprises a thin wall portion shaped on an outer periphery of said fixing portion and permits leaking of hydraulic liquid from said secondary liquid chamber to said primary liquid chamber through a leak hole provided in said frame member.

2. A liquid sealed vibration isolating device according to claim 1, wherein said relief valve is in contact with said frame portion surrounding said leak hole at all times except at the time of opening.

3. A liquid sealed vibration isolating device according to claim 1, wherein said relief valve has a surface of the secondary liquid chamber side formed in a shape of a slope extending obliquely toward said primary liquid chamber and radially outwardly.

4. A liquid sealed vibration isolating device according to claim 1, wherein said relief valve has a recessed portion opened on the side of said primary liquid chamber in the circumferential direction.

5. A liquid sealed vibration isolating device according to claim 1, wherein said relief valve comprises thin wall portions, and thick wall portions are formed alternately with the thin wall portions in the circumferential direction of said elastic diaphragm, and said thick wall portions are more rigid than said thin wall portions.

6. A liquid sealed vibration isolating device, comprising:
a first mounting member to be mounted on one of a couple of mounting counterparts,
a second mounting member to be mounted on the other of the mounting counterparts,
an insulator for connecting in a vibration isolating state between the first and the second mounting members,
a primary liquid chamber using the insulator as a part of the wall thereof and being filled with a hydraulic liquid, and
a secondary liquid chamber being partitioned from the primary liquid chamber by a partition member and having at least a portion of a wall formed by a diaphragm, the partition member having a circular elastic diaphragm for absorbing internal pressure fluctuation of the primary liquid chamber and a frame member for supporting an outer peripheral portion of the elastic diaphragm, a leak hole for communicating between the primary liquid chamber and the secondary liquid chamber, being provided on an outer peripheral side of an elastic diaphragm supporting portion of the frame member, and a relief valve for opening and closing the leak hole being provided integral with the outer peripheral portion of the elastic diaphragm,
wherein a thick wall portion is provided on the outer peripheral portion of the elastic diaphragm in the vicinity of the relief valve and supported by the frame member so as to arrest the rotation of the elastic diaphragm;

wherein the relief valve is formed by a thin wall portion of the outer peripheral portion of the elastic diaphragm, the thick wall portion, at least a portion of which is used for arresting the rotation, and the relief valve are formed alternately in the circumferential direction, and a difference in rigidity is given between the relief valve and the thick wall portion in the outer peripheral portion of the elastic diaphragm.

7. A liquid sealed vibration isolating device according to claim 6, wherein more than one thick wall portion is provided, and the thick wall portion used for arresting the rotation is higher in rigidity than other thick wall portion.

8. A liquid sealed vibration isolating device according to claim 6, wherein the thick wall portion used for arresting the rotation is provided with a seal lip for adhering to the frame member.

9. A liquid sealed vibration isolating device according to claim 6, wherein a projection projecting from the thick wall portion is fitted into a hole provided on the frame member so as to arrest the rotation.

\* \* \* \* \*